No. 633,543. Patented Sept. 19, 1899.
R. W. ANDERSON.
TOOL HOLDER FOR GRINDSTONES.
(Application filed Apr. 28, 1899.)

(No Model.) 2 Sheets—Sheet 1.

WITNESSES:
Charles P. Safford.
D. B. Gordon.

INVENTOR
Rollin W Anderson
BY
Byron B. Gordon
ATTORNEY.

THE NORRIS PETERS CO., PHOTO-LITHO., WASHINGTON, D. C.

No. 633,543. Patented Sept. 19, 1899.
R. W. ANDERSON.
TOOL HOLDER FOR GRINDSTONES.
(Application filed Apr. 28, 1899.)
(No Model.) 2 Sheets—Sheet 2.
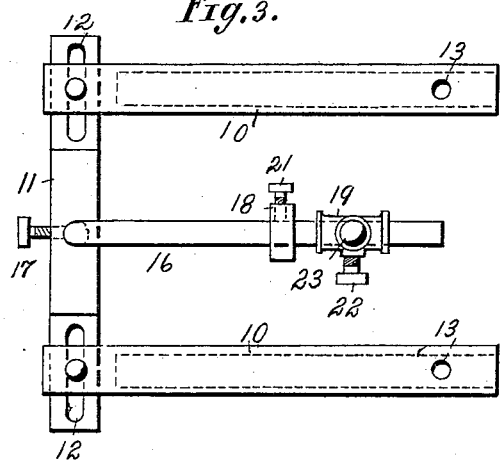
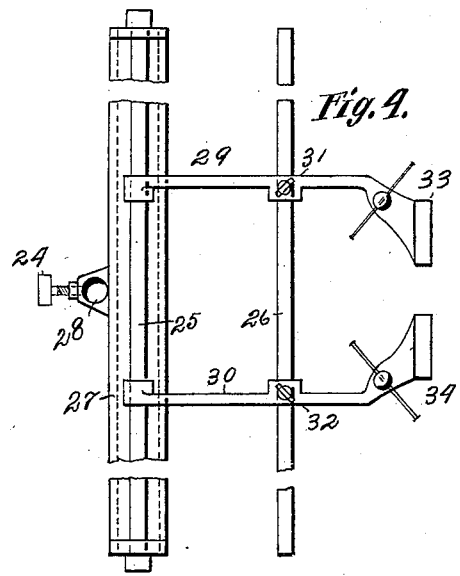
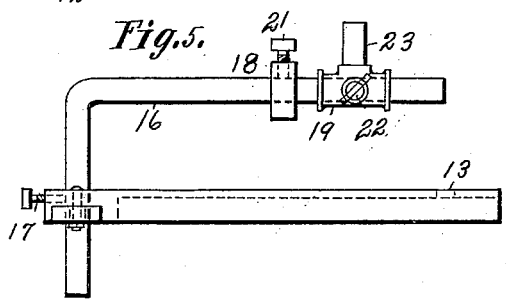
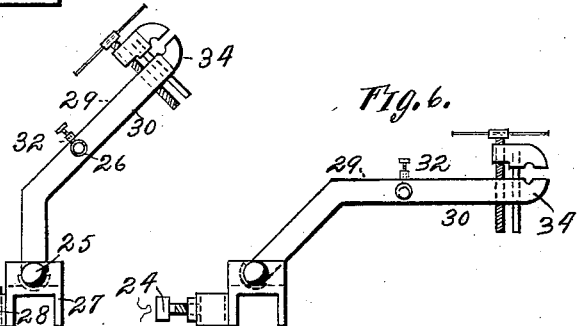
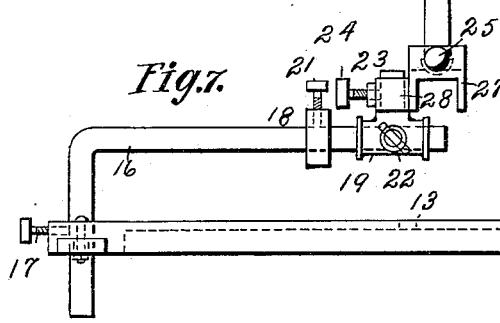
WITNESSES:
Charles P. Safford.
D. B. Gordon
INVENTOR
Rollin W. Anderson
BY
Byron B. Gordon
ATTORNEY.
THE NORRIS PETERS CO., PHOTO-LITHO., WASHINGTON, D. C.

UNITED STATES PATENT OFFICE.

ROLLIN W. ANDERSON, OF LOGANSPORT, INDIANA.

TOOL-HOLDER FOR GRINDSTONES.

SPECIFICATION forming part of Letters Patent No. 633,543, dated September 19, 1899.

Application filed April 28, 1899. Serial No. 714,786. (No model.)

*To all whom it may concern:*

Be it known that I, ROLLIN W. ANDERSON, a citizen of the United States, residing at Logansport, in the county of Cass and State of Indiana, have invented a new and useful Improvement in Tool-Holders for Grindstones; and I declare the following to be a clear and exact description of the invention, such as will enable others skilled in the art to which it pertains to make and use the same, reference being had to the accompanying drawings, which form a part of this specification.

This invention relates to that class of tool-holders which are adapted to be attached to any ordinary grindstone, especially those that are used on the farm or in the workshop.

The present invention has for its object, among others, to provide a tool-holder being adapted to hold a tool at any angle to the grindstone.

I provide a tool-holder which is adjustable to any angle and which at the same time imparts the same angle to the object or tool being ground.

Other objects and advantages of the invention will hereinafter appear, and the novel features thereof will be specifically defined by the appended claims.

The invention is clearly illustrated in the accompanying drawings, which, with the reference-numerals marked thereon, form a part of this specification, and in which—

Figure 1:
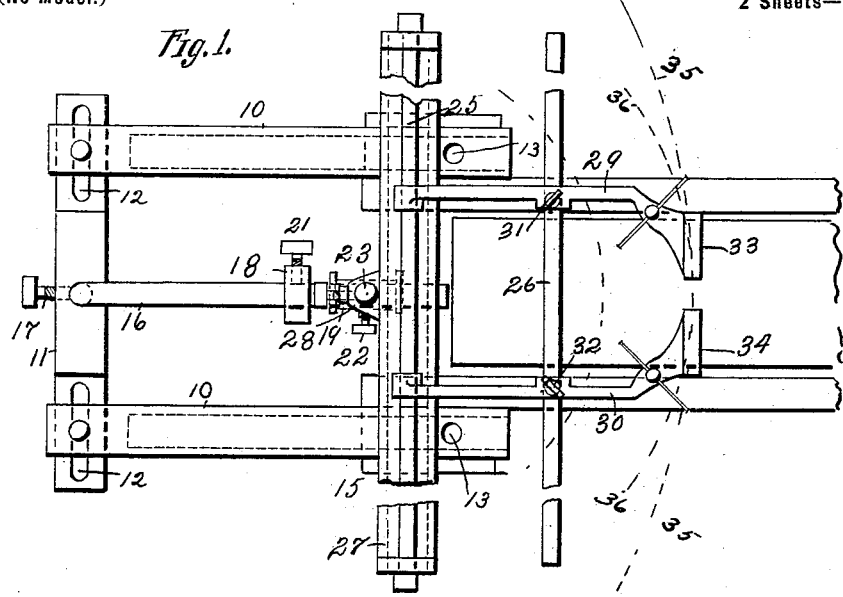
Figure 2:
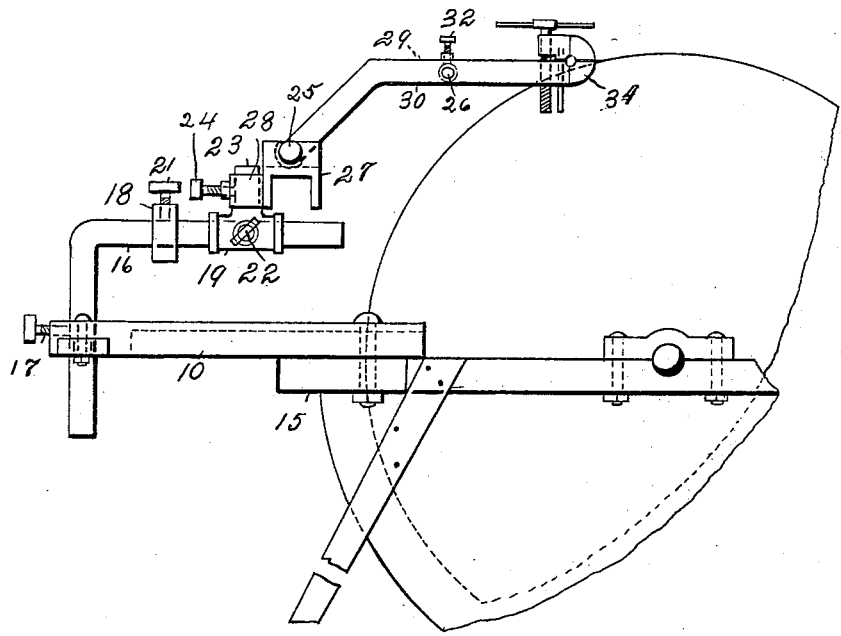

Figure 1 is a plan view of the tool-holder and grindstone. Fig. 2 is a side elevation of the tool-holder and grindstone. Fig. 3 is a detailed plan view of the base of the tool-holder. Fig. 4 is a detailed plan view of the upper part of the tool-holder. Fig. 5 is a detailed side elevation of the base of the tool-holder. Fig. 6 is a detailed side elevation of the upper part of the holder. Fig. 7 is a side elevation showing the upper framework in another position or angle.

The tool-holding device may be said to be composed of two sections, the lower and upper. The two parallel pieces 10 and the cross strip or bar 11 form the base or lower part of the framework of the tool-holder. The strip 11 is provided with slots 12, thus providing means to adapt the tool-holder on narrow or wide grindstones, the slots 12 permitting the parallel strips 10 to move farther or nearer apart. The said strips 10 are provided with apertures 13, thus providing means to secure the tool-holding frame to the grindstone-frame 15. The strip or bar 11 supports the angular shaft 16, the said shaft being secured by the set-screw 17. The shaft 16 is provided with the adjustable collar 18 and the sleeve 19. The said collar and said sleeve are both adapted to move along the shaft 16 to any desired point and secured thereon by set-screws 21 and 22. The sleeve 19 is provided with a shaft 23, to which the upper half of the tool-holder, Fig. 4, is secured by the set-screw 24.

The upper framework of the tool-holding device consists of the parallel shafts 25 and 26. The shaft 25 is secured to the bar 27. The said bar 27 is provided with the projection 28. The said projection is adapted to receive the shaft 23, thereby uniting the upper and lower sections of the framework. The shafts 25 and 26 are maintained in their parallel position by the connecting-bars 29 and 30. The said bars are adapted to move to and fro on shafts 25 and 26 and may be secured thereon at any desired point by set-screws 31 and 32. The connecting-bars 29 and 30 are provided with the vises or clamps 33 and 34. The object of said vises 33 and 34 is to secure therein any tool to be sharpened.

Two vises 33 and 34 are provided, so as to facilitate the holding of long tools—for instance, a reaping-machine sickle or an unusually long knife-blade.

The position of the tool-holding device, as shown in Figs. 1 and 2, causes the grindstone to impart to the tool being ground a long taper or small angle. To impart a larger or smaller angle to the tool, I move the sleeve 19 to or from the angular shaft 16. The collar 18 is provided, so as to maintain the angle when secured. The usual position of the said collar is against the sleeve 19.

In order to grind the tool to any angle desired, I have a series of pivots on which the tool-holder may swing to different positions—for instance, the angular shaft 16, when the set-screw 17 is loosened, it may swing around, as shown by the dotted lines 35. A line 36 would be described if the upper section of framework would swing around the shaft 23, the difference being in the length of different radii. Pivots are also provided at 37 and 38, thus providing pivotal movements for the tool-holding device, and thereby facilitating the acquiring of any angle desired.

What I claim as my invention, and desire to secure by Letters Patent, is—

1. In a tool-holding device, the combination of a grindstone-frame with parallel pieces 10, connecting-piece 11, the said connecting-piece being slotted thereby adapting the tool-holder to any grindstone, of angular shaft 16 the said shaft having connected thereon an adjustable collar and sleeve 19, the said shaft 16 being pivotally connected to connecting bar or piece 11 and means for holding the tool to be sharpened: substantially as described.

2. In a tool-holding device, the combination of a grindstone of an adjustable shaft 26, of the upper section-bars 29 and 30, shaft 25 connecting-bars 29 and 30 the said bars 29 and 30 being pivotally connected to shaft 25, and provided with clamp or vise 33 and 34 thereby providing means to hold tools therein, of the lower section and the bar 27, the said bar having projection 28 thereby providing means to connect the lower and upper section of the tool-holding device: substantially as described.

3. In a tool-holding device, the combination of supporting-strips, an adjustable cross-bar connecting the same, a shaft adjustable in said cross-strip, a lower section adjustable on said shaft, an upper section pivotally connected with the lower section, and tool-holding clamps adjustable on the upper section, substantially as and for the purpose specified.

ROLLIN W. ANDERSON.

Witnesses:
D. B. GORDON,
MEHILLE M. GORDON.